United States Patent [19]

Hanish

[11] Patent Number: 5,137,216

[45] Date of Patent: Aug. 11, 1992

[54] MULTIPLE UNIT DRIP IRRIGATOR

[75] Inventor: Barry N. Hanish, Sherman Oaks, Calif.

[73] Assignee: Raindrip, Inc., Chatsworth, Calif.

[21] Appl. No.: 503,834

[22] Filed: Apr. 3, 1990

[51] Int. Cl.$^5$ .......................... B05B 1/14; B05B 15/06
[52] U.S. Cl. .................................................. 239/542
[58] Field of Search ......................................... 239/542

[56] References Cited

U.S. PATENT DOCUMENTS

| | | |
|---|---|---|
| 3,420,064 | 12/1966 | Blass et al. . |
| 3,604,728 | 9/1971 | Blass et al. . |
| 3,667,685 | 6/1972 | Rinkewich . |
| 3,729,142 | 4/1973 | Rangel-Garza et al. . |
| 3,791,587 | 2/1974 | Drori . |
| 3,792,588 | 2/1974 | Gilaad . |
| 3,815,636 | 6/1974 | Menzel . |
| 3,834,628 | 9/1974 | Selman . |
| 3,882,892 | 5/1975 | Menzel . |
| 3,887,139 | 6/1975 | Pearce . |
| 3,896,999 | 7/1975 | Barragan . |
| 4,392,616 | 7/1983 | Olson . |
| 4,460,129 | 7/1984 | Olson . |
| 4,589,595 | 5/1986 | Havens . |
| 5,054,690 | 10/1991 | Olson ............................ 239/542 |

FOREIGN PATENT DOCUMENTS

| | | | |
|---|---|---|---|
| 2550470 | 2/1985 | France | 239/542 |
| 2614557 | 11/1988 | France | 239/542 |

OTHER PUBLICATIONS

"The EH-12 Emitter Head," Olson Irrigation Systems.

*Primary Examiner*—Andres Kashnikow
*Assistant Examiner*—Lesley D. Morris
*Attorney, Agent, or Firm*—Benoit Law Corporation

[57] ABSTRACT

Multiple unit drip irrigators use several self-contained on-line drip irrigation devices, each comprising a distinct housing having a liquid inlet, a tubular liquid outlet and containing a labyrinthine liquid path between such inlet and outlet. A common manifold contains the several drip irrigation devices. Such manifold has a common liquid inlet communicating through a space in that manifold with the liquid inlets of the drip irrigation device housings. The manifold has as many distinct internal supports for the housings of the drip irrigation devices as there are drip irrigation devices. Each of such internal supports has a bore for receiving the tubular liquid outlet of one of the housings of the on-line drip irrigation devices and each of such internal supports has an individual outlet terminal extending from the bore in that internal support to an outside of the common manifold.

21 Claims, 2 Drawing Sheets

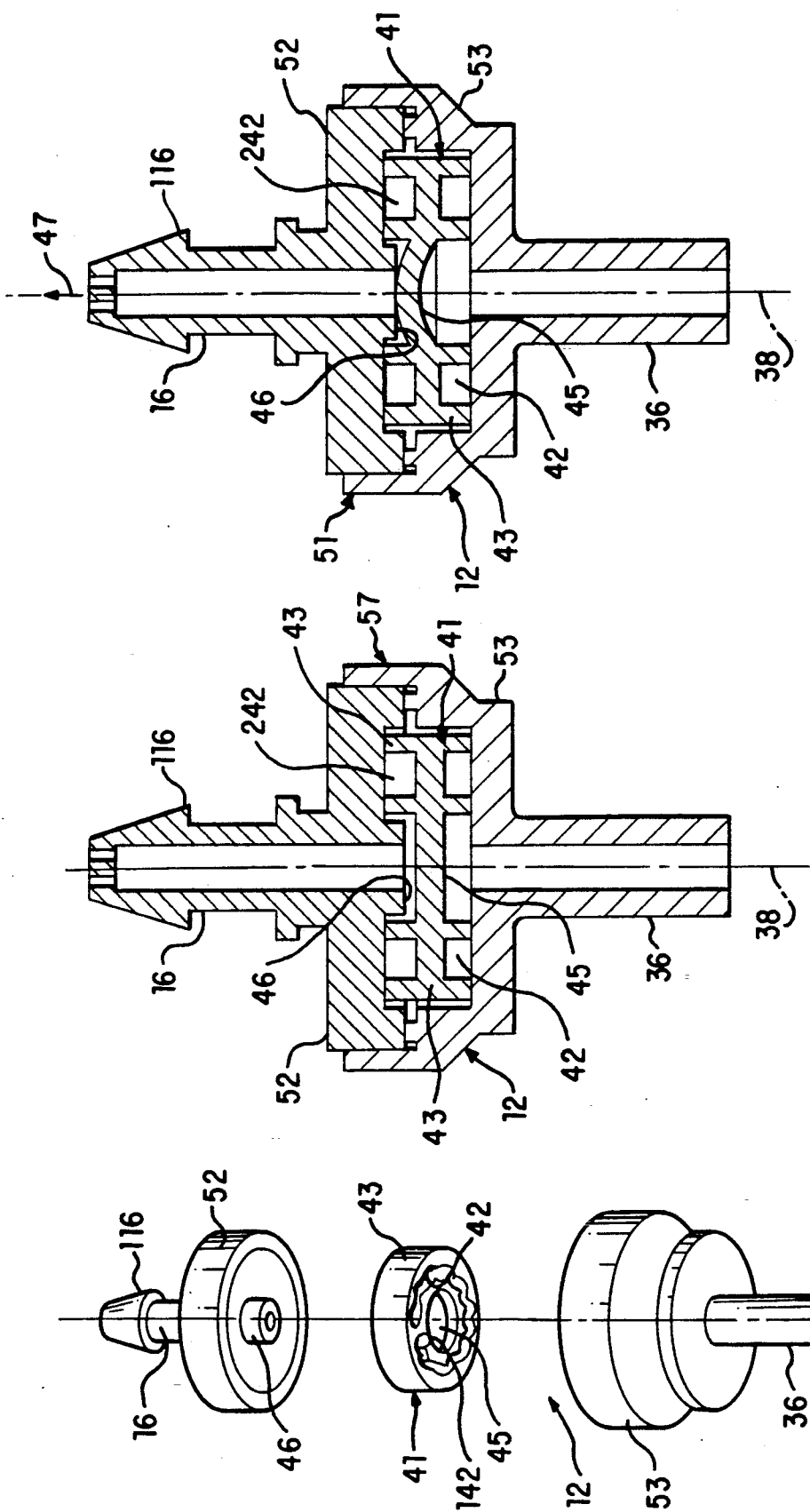

MULTIPLE UNIT DRIP IRRIGATOR

BACKGROUND OF THE INVENTION

1. Field of the Invention

The present invention relates to irrigation systems and to trickle or drip irrigation methods and apparatus for dispensing water and other liquids with or without fertilizers for the nourishment of plants and other vegetation below, on and above the ground.

2. Information Disclosure Statement

By way of background, U.S. Pat. No. 3,420,064, by Blass et. al., issued Jan. 7, 1969, discloses an irrigation dripper unit containing a continuous elongated helical groove for deriving water in small quantities from a main stream. U.S. Pat. No. 3,604,728, by Blass et. al., issued Sept. 14, 1971, also discloses a continuous elongated helical groove in an irrigation dripper unit.

An irrigation device effecting drip action of water from a central tube was disclosed in U.S. Pat. No. 3,667,685, by Isaac Rinkewich, issued June 6, 1972. The flow path of the water in that device is labyrinthine so that the water path continuously reverses in order to create substantial turbulence to maintain in suspension the foreign matter to minimize the likelihood of clogging.

Another dripper for irrigation was disclosed in U.S. Pat. No. 3,729,142, by Rangel-Garza et. al., issued Apr. 24, 1973. That irrigation dripper comprises a substantially cylindrical hollow thin walled female member having an open receptacle end and a smooth interior wall surface, a male member for insertion into the female member having ridges on its outer surface for engaging said interior wall and providing between the wall and the valleys between the ridges of the male member a meandering zig-zag liquid low path and discharge means for the liquids between the male and female members thereby providing with the female and male members a liquid dispensing head. That dripper is proposed as an on-line dripper.

Other flow-reducing devices are apparent from U.S. Pat. No. 3,791,587, by Mordeki Drori, issued Feb. 12, 1974, which discloses also a disc-shaped flow retaining member between disc-shaped annular walls of a drip irrigator.

The subsequent U.S. Pat. No. 3,792,588, by Yigal Gilaad, issued Feb. 19, 1974, for a trickle irrigation unit comprising a pair of telescopic members, of which one is formed with a continuous groove forming with the other member a large cross-section flow path having continuous direction-changing bends.

Drippers of the latter type may be referred to as "inline drippers", since they have two opposite liquid ports for connecting such drippers into one continuous line.

U.S. Pat. No. 3,815,636, by Stanley W. O. Menzel, issued June 11, 1974, disclosed use of an elastomeric member for drip feed pressure control in devices that may be used in-line or on-line.

In this respect, an "on-line" dripper usually has only one liquid input port for connection to a supply line, as shown, for instance, in U.S. Pat. No. 3,834,628, by Herzl Selman, issued Sept. 10, 1974, for trickle irrigation devices comprising an outer housing and an inner core. The contacting surfaces of the housing and core define a chamber and a plurality of separate parallel labyrinths each communicating with the chamber. The core is fixed within the housing by means of threads which define a spirally-extending conduit providing a path, between the water inlet and the chamber to the labyrinths. In one described embodiment, the core is a unitary member formed with both the threads and the labyrinth configuration; and in a second described embodiment the core comprises two sections, one being formed with the threads, and the other being a replaceable annular insert formed with the labyrinth configuration.

In another on-line dripper, interconnected mating housing halves have a disc sandwiched therebetween and carrying a labyrinthine path in the form of two series-connected circular turns distributed over the two major sides thereof. One of these housing halves has the liquid input port integral therewith, while the dripper output is integral with the other housing half. The disc may include a flexible diaphragm acting on an inward projection of the dripper output to alleviate the effect of excessive water pressure.

An anti-clogging drip irrigation valve is disclosed in U.S. Pat. No. 3,896,999, by Jaime S. Barragan, issued July 29, 1975. A button drip feed device for on-line use is disclosed in U.S. Pat. No. 3,882,892, by S. W. O. Menzel, issued May 13, 1975. Another trickle irrigation emitter is disclosed in U.S. Pat. No. 3,887,139, by D. N. Pearce, issued June 3, 1975.

There is a multiplex dripper assembly for sprinkler risers which contains six independent pressure compensating drippers in a single housing having a common input connected to the sprinkler riser. Each dripper has its own tubular dripper output. Six dripper hoses may thus be served by that multiplex dripper assembly.

There further is an in-line dripper in which a cylindrical male member has series of interconnected labyrinthine paths extending along sections of the cylindrical surface in parallel planes extending at right angles to the longitudinal in-line axis of the dripper. The also cylindrical female member closes these labyrinthine paths circumferentially, and the male member has a radial slot forming the dripper outlet at the female member.

Reference may also be had to U.S. Pat. Nos. 4,392,616, issued July 12, 1983 for Self-Perforating Drip Irrigation Devices and U.S. Pat. No. 4,460,129, issued July 17, 1984 for Turbulent Flow Emitter, to Donald O. Olson, and to U.S. Pat. No. 4,589,595, by Glenn G. Havens, issued May 20, 1986 for Pressure Compensated Emitter.

Reference may further be had to a brochure by OLSON IRRIGATION SYSTEMS, entitled "The EH-12 Emitter Head," and showing a multiple-outlet dripper head with multiple internal emitter device inserts.

SUMMARY OF THE INVENTION

It is a general object of this invention to provide improved drip irrigation.

It is a germane object of the invention to provide improved drip irrigation apparatus.

It is a related object of this invention to render on-line drip irrigators more versatile and more flexible in their use and application.

It is also an object of this invention to provide multiple unit drip irrigators using low-cost components that are self-contained for individual use as well.

It is a further object of the invention to provide drip irrigation devices which issue liquids directly into the ground at rates that are variable by stepped increments and that are also substantially exact as to and within each increment.

It is also an object of the invention to provide self-contained anti-siphon on-line drip irrigation devices.

It is also an object of the invention to provide multiple outlet irrigation apparatus that are easily converted to drip irrigators and back to water distributors, or that may perform a combination of such functions.

Other objects of the invention will become apparent in the further course of this disclosure.

The invention resides in a method of irrigating soil with several on-line drip irrigation devices, comprising in combination the steps of providing each of said on-line drip irrigation devices with a distinct self-contained housing having a liquid inlet, a tubular liquid outlet and containing a labyrinthine liquid path between that inlet and that outlet, providing a common manifold for containing the several drip irrigation devices, providing the manifold with a common liquid inlet communicating through a space in that manifold with the liquid inlets of the distinct self-contained housings of the drip irrigation devices, providing the manifold with as many distinct internal supports for the distinct self-contained housings as the number of said several drip irrigation devices, providing each of these internal supports with a bore for receiving the tubular liquid outlet of one of the distinct self-contained housings, and providing for each of those internal supports an individual outlet terminal extending from the bore in that internal support to an outside of the common manifold.

From a related aspect thereof the invention resides in apparatus for irrigating soil with several on-line drip irrigation devices, comprising, in combination, a distinct self-contained housing for each of these drip irrigation devices having a liquid inlet, a tubular liquid outlet and containing a labyrinthine liquid path between that inlet and that outlet, a common manifold for said several drip irrigation devices, that manifold having a common liquid inlet communicating through a space in that manifold with the liquid inlets of the distinct self-contained housings of the drip irrigation devices, several distinct internal supports for the distinct self-contained housings of the drip irrigation devices in the manifold, a bore in each of these supports for receiving the tubular liquid outlet of one of the distinct self-contained housings of the drip irrigation devices, and an individual outlet terminal for each of these bores extending to an outside of the common manifold.

The invention resides also in apparatus for irrigating soil, comprising, in combination, a liquid inlet, a liquid outlet, means for providing a labyrinthine liquid path between that inlet and that outlet, and an anti-siphon element at the inlet and a flexible portion of said means spaced from the anti-siphon element for selectively closing the inlet at the anti-siphon element.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which:

FIG. 3 is an exploded view of a drip irrigator device that may be used in the apparatus of FIGS. 1 or 2 or independently;

FIG. 4 is a section through the drip irrigator device of FIG. 3; and

FIG. 5 is a section similar to FIG. 4 showing the drip irrigator device in an anti-siphon mode.

DESCRIPTION OF PREFERRED EMBODIMENTS

Figure 1:
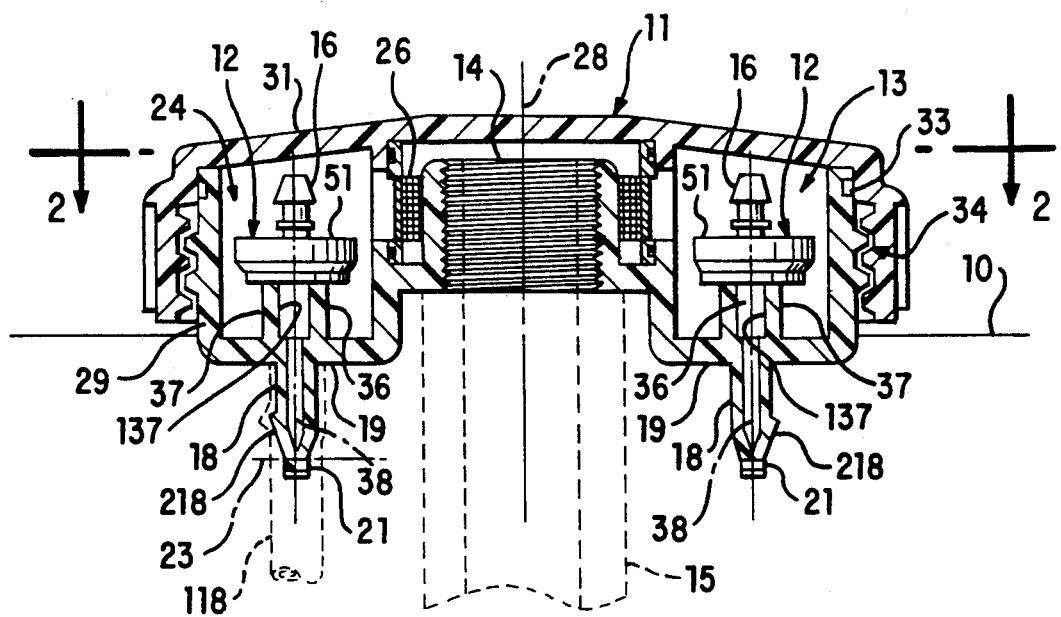
FIG. 1 is a section through an irrigation apparatus according to a preferred embodiment of the subject invention.
Figure 2:
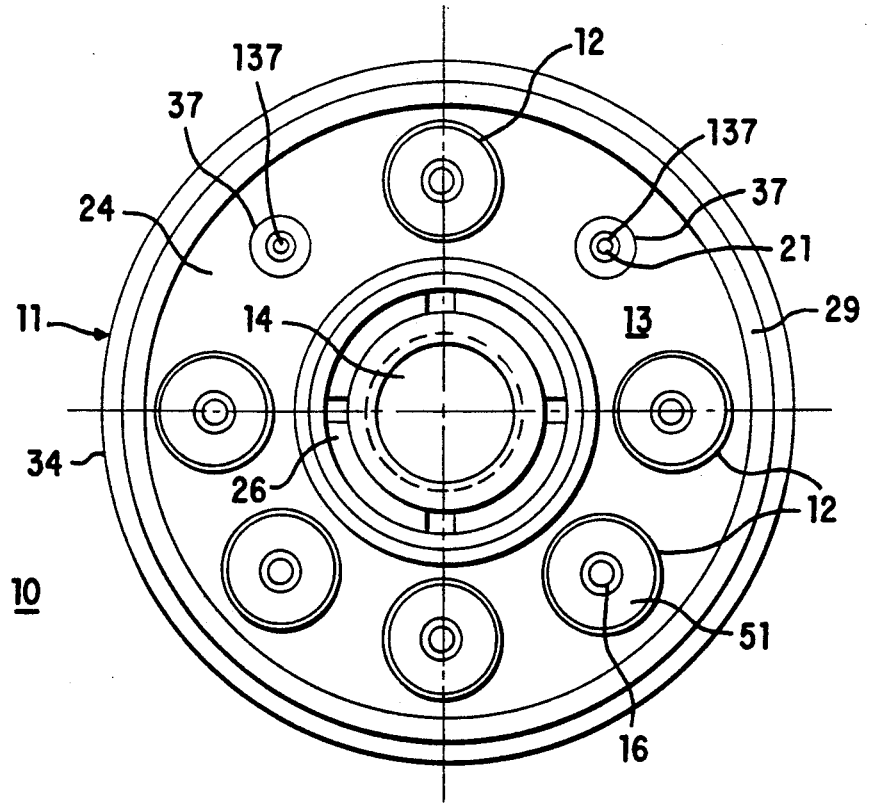
FIG. 2 is a plan view of the apparatus of FIG. 1, with the cover removed therefrom.

The illustrated embodiments relate to apparatus and methods for irrigating soil, shown diagrammatically at 10, from a drip irrigation system including drip irrigation devices 12. The embodiment of FIGS. 1 and 2 provides an apparatus 11 with a common manifold 13 for containing several drip irrigation devices 12, and provides that manifold with a common water or other liquid inlet 14 that may be connected to an underground water supply line 15, for instance.

The drip irrigation devices 12 may be of an on-line type, each having a distinct self-contained housing 51 having a water or other liquid inlet 16, a tubular water or other liquid outlet 36, and containing a labyrinthine water or other liquid path 42 between that inlet and that outlet, as seen in FIGS. 3 to 5 by way of example. The individual inlets 16 are communicating through a space 24 inside the manifold 13 with the common water inlet 14.

The manifold 13 is provided with several internal supports 37 for the drip irrigation devices. It may be said that the manifold is provided with as many distinct internal supports 37 for the distinct self-contained housings 51 of the drip irrigation devices as the total number of the several drip irrigation devices 12 accommodable in that manifold 11. In the illustrated embodiment, the supports 37 are in the form of seats or nipples. Each such support, seat or nipple 37 is provided with a bore 137 for receiving the tubular liquid outlet 36 of one of the on-line drip irrigation devices 12. In this sentence, as well as in the further course of this description, the expression "self-contained housing or housings 51" may be added to or substituted for "drip irrigation device or devices 12."

The illustrated embodiment of the invention also provides for each of the internal supports 37 an individual outlet terminal 18 extending from the bore 137, in the particular internal support to an outside 19 of the common manifold.

As seen at 21, the individual outlet terminals 18 of the drip irrigation devices preferably are closed until a use of the manifold 13 for drip irrigation purposes through at least one of the drip irrigation devices 12 is desired. These manifold outlets 18 are called "terminals," since they are closed until they are opened, such as by cutting off their tip, as indicated by a phantom line 23.

In practice, the apparatus 11 is easily adapted to individual needs in that less than all of the individual outlet terminals 18 may be opened for a use of less than all of the drip irrigation devices 12 for irrigation purposes through the manifold 13 or through the hollow space 24 therein.

If and when needed, all individual outlet terminals 18 are opened for at least potentially maximum drip irrigation through the manifold 13 and all of its drip irrigation devices 12.

However, all of the individual outlet terminals 18 of the drip irrigation devices 12 are initially closed, such as by provision of the closed bottoms 21, pending a desired use of the manifold 13 for drip irrigation purposes through one or more of the drip irrigation devices.

A common filtering element 26 is provided between the common water inlet 14 and all individual inlets 16 of the several drip irrigation devices 12 inside the manifold 13. This, for instance, enables connection of the apparatus 11 to an underground water system that may be contaminated.

The several drip irrigation devices 12 or the distinct internal supports 37 therefor are distributed about the common water inlet 14 inside the manifold 13. Preferably, the several drip irrigation devices 12 are arranged coaxially with the common water inlet 14. Also preferably, the several drip irrigation devices 12 are distributed regularly around the common water inlet 14.

In the illustrated embodiment, the manifold 13 is arranged coaxially with the common water inlet 14; such as about the common axis 28. The manifold may have a circular housing 29 about or coaxial with the water inlet 14.

The manifold 13 or its housing 29 is provided with a removable cover 31 extending over all of the several drip irrigation devices 12 or the distinct internal supports 37 therefor. The cover 31 may be a cleanout cover permitting access to, and even exchange of, the filter element 26 and to any and all drip irrigation devices 12 and insertion thereof into, and removal from, the supports or seats 37 or the manifold 11. The cover 31 is sealed to the housing 29 by an O-ring 33 and is removably attached thereto by mating threads 34 provided outside the manifold housing 29 and inside the cover 31, respectively.

The tubular outlets or outlet nipples 36 of the drip irrigation devices 12 preferably are coaxial with a corresponding manifold support or nipple 37 or bore 137, such as about an axis 38.

For optimum flexibility of utility the devices 12 may thus be exchanged for different drip irrigation devices having all desired kinds of flow characteristics. The apparatus thus is capable to issue water or other liquids directly into the ground 10 at rates that are variable by stepped increments as indicated at 23, and that are still substantially exact as to and within each increment.

Conventional drip irrigation devices may be used at 12 to assure that substantial exactitude. FIGS. 3 to 5 show a drip irrigation device 12 according to a preferred embodiment of the invention. The tubular inlet of that device 12 has a stepped conical inlet portion 116 facilitating attachment to a hose or similar conduit (not shown) if the device 12 is used apart from the manifold for irrigating soil, such as the soil 10.

Conversely, the apparatus 11 may be used without dripping devices 12 as a distributor of water to several hoses, one of which is shown at 118 as releasably retained by a barb 218. Such barbs and hoses may also be used in conjunction with drip irrigating devices 12.

The or each device 12 includes means 41 for providing a labyrinthine water path 42 between the inlet 16 and the outlet 36. A molded or otherwise preformed disc 43 of an elastomeric or other flexible material may be used for that purpose. As seen in FIG. 3, the water path 42 has an outlet 142 connected to the water outlet 36. A corresponding labyrinthine water path 242 may be provided in the disc 43 in communication with the water inlet 16 through a notch (not shown) similar to the outlet notch 142. An aperture (not visible in the drawings) interconnects the paths 42 and 242 in series between the water inlet 16 and outlet 36. However, it should be understood that the invention is not limited to this or another form of drip irrigation device.

Nevertheless, if the disc 43 or other means for forming a labyrinthine path has a flexible portion, such as shown at 45 or otherwise, then an anti-siphon device may be provided in the drip irrigator. By way of preferred example, an inwardly extending nipple 46 may be provided at the inlet 16 into proximity to the flexible portion 45. The illustrated preferred embodiment thus has an anti-siphon element 46 at the inlet and the flexible portion 45. As seen in FIG. 4, the flexible portion 45 is normally spaced from the anti-siphon element 46. However, that flexible portion 45 is effective for selectively closing the inlet 16 at the anti-siphon element 46, such as if there occurs a backward pressure as indicated by the arrow 47 in FIG. 5. In this manner, backflow contamination into the water supply 15 is effectively prevented.

The drip irrigation device 12 may have a shell or housing 51 formed by interconnected mating housing halves 52 and 53 that also provide the inlet 16 and outlet 36, respectively. Other housings may be used within the scope of the the invention as long as each drip irrigation device 12 is self-contained within itself and can thus be used in the apparatus 11 or outside by itself.

The subject extensive disclosure will render apparent or suggest to those skilled in the art various modifications and variations within the spirit and scope of the subject invention and equivalents thereof.

We claim:

1. In a method of irrigating soil with several on-line drip irrigation devices, the improvement comprising in combination the steps of:

providing each of said on-line drip irrigation devices with a distinct self-contained housing having a liquid inlet, a tubular liquid outlet and containing a labyrinthine liquid path between said inlet and said outlet;

providing a common manifold for containing said several drip irrigation devices;

providing said manifold with a common liquid inlet communicating through a space in said manifold with the liquid inlets of the distinct self-contained housings of the drip irrigation devices;

providing said manifold with as many distinct internal supports for said distinct self-contained housings as the number of said several drip irrigation devices;

providing each of said internal supports with a bore for receiving the tubular liquid outlet of one of said distinct self-contained housings; and providing for each of said internal supports an individual outlet terminal extending from the bore in that internal support to an outside of said common manifold.

2. A method as in claim 1, wherein:

the individual outlet terminals of the drip irrigation devices are closed until a desired use of said manifold for drip irrigation purposes through at least one of said drip irrigation devices.

3. A method as in claim 1, wherein:

less than all of the individual outlet terminals are opened for a use of less than all of said drip irrigation devices for irrigation purposes through said manifold.

4. A method as in claim 1, wherein:

all individual outlet terminals are opened for at least potentially maximum drip irrigation through said manifold and all of said drip irrigation devices.

5. A method as in claim 1, including the step of:

providing a common filtering element between said common liquid inlet and all individual liquid inlets of the distinct self-contained housings of said several drip irrigation devices inside said manifold.

6. A method as in claim 1, including the step of:
distributing said distinct internal supports for the distinct self-contained housings of said several drip irrigation devices about said common liquid inlet inside said manifold.

7. A method as in claim 1, including the step of:
arranging said distinct internal supports for the distinct self-contained housings of said several drip irrigation devices coaxially with said common liquid inlet.

8. A method as in claim 1, including the step of:
distributing said distinct internal supports for the distinct self-contained housings of said several drip irrigation devices regularly around said common liquid inlet.

9. A method as in claim 1, including the step of:
arranging said distinct internal supports for the distinct self-contained housings of said drip irrigation devices coaxially with said common liquid inlet.

10. A method as in claim 1, including the step of:
arranging said manifold coaxially with said common liquid inlet.

11. A method as in claim 1, including the step of:
providing said manifold with a removable cover extending over all of said distinct internal supports for the distinct self-contained housings of said several drip irrigation devices.

12. Apparatus for irrigating soil with several on-line drip irrigation devices, comprising in combination:
a distinct self-contained housing for each of said drip irrigation devices having a liquid inlet, a tubular liquid outlet and containing a labyrinthine liquid path between said inlet and said outlet;
a common manifold for said several drip irrigation devices, said manifold having a common liquid inlet communicating through a space in said manifold with the liquid inlets of the distinct self-contained housings of the drip irrigation devices;
several distinct internal supports for said distinct self-contained housings of the drip irrigation devices in said manifold;
a bore in each of said supports for receiving the tubular liquid outlet of one of said distinct self-contained housings of the drip irrigation devices; and
an individual outlet terminal for each of said bores extending to an outside of said common manifold.

13. Apparatus as in claim 12, including:
means for closing the individual outlet terminals of the drip irrigation devices pending a desired use of said manifold for drip irrigation purposes through at least one of said drip irrigation devices.

14. Apparatus as in claim 12, including:
a common filtering element between said common liquid inlet and all individual liquid inlets of said distinct self-contained housings of the several drip irrigation devices inside said manifold.

15. Apparatus as in claim 12, wherein:
said distinct internal supports for said distinct self-contained housings of the several drip irrigation devices are distributed about said common liquid inlet inside said manifold.

16. Apparatus as in claim 12, wherein:
said distinct internal supports for said distinct self-contained housings of the several drip irrigation devices are coaxial with said common liquid inlet.

17. Apparatus as in claim 12, wherein:
said distinct internal supports for said distinct self-contained housings of the several drip irrigation devices are distributed regularly around said common liquid inlet.

18. Apparatus as in claim 17, wherein:
said distinct internal supports for said distinct self-contained housings of the drip irrigation devices are coaxial with said common liquid inlet.

19. Apparatus as in claim 12, wherein:
said manifold has a circular housing coaxial with said common liquid inlet.

20. Apparatus as in claim 12, wherein:
said manifold has a removable cleanout cover extending over all of said distinct internal supports for said distinct self-contained housings of the several drip irrigation devices.

21. Apparatus as in claim 12, wherein:
each of said distinct self-contained housings of the several drip irrigation devices contains means for providing a labyrinthine water path between its liquid inlet and its liquid outlet; and
each of said distinct self-contained housings of the several drip irrigation devices has an anti-siphon element at its liquid inlet and said means have a flexible portion spaced from said anti-siphon element for selectively closing that inlet at the antisiphon element.

* * * * *